United States Patent [19]

Grabowski

[11] Patent Number: 5,210,548
[45] Date of Patent: May 11, 1993

[54] METHOD AND SYSTEM FOR REDUCING SURFACE REFLECTIONS FROM A PHOTOSENSITIVE IMAGING MEMBER

[75] Inventor: Edward E. Grabowski, Webster, N.Y.

[73] Assignee: Xerox Corporation, Stamford, Conn.

[21] Appl. No.: 738,771

[22] Filed: Aug. 1, 1991

[51] Int. Cl.$^5$ .............................................. H04N 1/21
[52] U.S. Cl. ...................................... 346/108; 430/31; 369/13; 346/1.1
[58] Field of Search ................... 346/108, 160, 107 R, 346/1.1; 369/13, 110, 112; 430/31

[56] References Cited

U.S. PATENT DOCUMENTS 4,618,552 10/1986 Tanaka et al. ......................... 430/60
5,073,879 12/1991 Ando et al. ............................ 369/13

*Primary Examiner*—Mark J. Reinhart

[57] ABSTRACT

A raster output scanner (ROS) system is configured to direct a scanning beam of light against a surface of a photosensitive imaging member at the Brewster angle is determined by the angle of refraction of the medium on both sides of the interface. When incident at the Brewster angle, the light rays, polarized in the plane parallel to the plane of incidence, will be almost totally absorbed by the photosensitive layer of the imaging member, resulting in almost total elimination of primary reflections from the surface of the imaging member. The increased transmission yields two benefits. The plywood effect created by the interference of the first dominant reflection from the top surface, and a second dominant reflection from the ground plane of the imaging member is eliminated. The second byproduct of exposing the imaging member at the Brewster angle is to create a reduction in the permissible tolerances for variations of the thickness of the photosensitive top layer of the imaging member.

6 Claims, 4 Drawing Sheets

METHOD AND SYSTEM FOR REDUCING SURFACE REFLECTIONS FROM A PHOTOSENSITIVE IMAGING MEMBER

BACKGROUND AND MATERIAL DISCLOSURE STATEMENT

The present invention relates to an imaging system using coherent light radiation to expose a layered member in an image configuration and more particularly, to a method for directing the light radiation into the imaging member so as to reduce optical interference occurring within said photosensitive member which results in a plywooding type of defect in output prints.

There are numerous applications in the electrophotographic art wherein a coherent beam of radiation, typically from a helium-neon or diode laser is modulated by an input image data signal. The modulated beam is directed (scanned) across the surface of a photosensitive medium. The medium can be, for example, a photoreceptor drum or belt in a xerographic printer, a photosensor CCD array, or a photosensitive film. Certain classes of photosensitive medium which can be characterized as "layered photoreceptors" have at least a partially transparent photosensitive layer overlying a conductive ground plane. A problem inherent in using these layered photoreceptors, depending upon the physical characteristics, is an interference effectively created by two dominant reflections of the incident coherent light on the surface of the photoreceptor; e.g., a first reflection from the top surface and a second reflection from the bottom surface of the relatively opaque conductive ground plane. This condition is shown in FIG. 1: a coherent beam is incident on a layered photoreceptor 6 comprising a charge transport layer 7, charge generator layer 8, and a ground plane 9. The interference effects can be explained by following two typical rays of the incident illumination. The two dominant reflections of a typical ray 1, are from the top surface of layer 7, ray A, and from the top surface of ground plane 9, ray C. The transmitted portion of ray C, ray E, combines with the reflected portion of ray 2, ray F, to form ray 3. Depending on the optical path difference as determined by the thickness and index of refraction of layer 7, the interference of rays F and E can be constructive or destructive when they combine to form ray 3. The transmitted portion of ray 2, ray G, combines with reflected portion of ray C, ray D, and the interference of these two rays determines the light energy delivered to the generator layer 8. When the thickness is such that rays E and F undergo constructive interference, more light is reflected from the surface than average, and there will be destructive interference between rays D and G, delivering less light to generator layer 8 than the average illumination. When the transport layer 7 thickness is such that reflection is a minimum, the transmission into layer 8 will be a maximum. The thickness of practical transport layers varies by several wavelengths of light so that all possible interference conditions exist within a square inch of surface. This spatial variation in transmission of the top transparent layer 7 is equivalent to a spatial exposure variation of generator layer 8. This spatial exposure variation present in the image formed on the photoreceptor becomes manifest in the output copy derived from the exposed photoreceptor. FIG. 2 shows the areas of spatial exposures variation (at 25×) within a photoreceptor of the type shown in FIG. 1 when illuminated by a helium-neon laser with an output wavelength of 633 nm. The pattern of light and dark interference fringes look like the grains on a sheet of plywood. Hence the term "plywood effect" is generically applied to this problem.

There are several methods for compensating for the plywood effect known in the prior art. These methods fall into two general techniques; to either change the structure of the imaging member to reduce the second dominant reflection from the imaging member ground plane or to reduce or eliminate the first reflection from the top surface. Some prior art references directed toward reducing the second dominant reflections are: U.S. Pat. No. 4,618,552 and co-pending application U.S. Ser. No. 07/546,990, assigned to the same assignee as for the present application, both of which describe methods for roughening the surface of the ground plane of the imaging member to create a diffuse reflection of the light reflected therefrom.

The present invention is directed toward reducing the first dominant reflection, e.g. the reflection from the top surface of the imaging member. This reflection can be reduced by diffusing the light from the top surface by roughening the surface of the imaging member as disclosed in U.S. Ser. No. 07/546,214 assigned to the same assignee as for the present application. The incident radiation can also be modified by a technique described in application Ser. No. 07/546,214, filed on Jun. 24, 1990, and assigned to the same assignee as the present invention, which discloses a method for merging scanned beams from 2 or more diodes at a photoreceptor surface. The beams are at different wavelengths producing an exposure variation pattern at the surface which compensates for the plywood exposure.

These prior art techniques for reducing the first dominant reflection may not be suitable for all systems; many applications may not tolerate a roughened top surface for the imaging member, and the merged beam technique requires two separate laser sources and may be prohibitively expensive. The present invention is directed toward a method for reducing plywood by practically eliminating the top surface reflection that combines with the inner reflection from ground plane E to cause the interference effects generating our exposure variations. There will still be some reflected light but this light will not vary with the thickness of transport layer 7, as there is no longer any interference, so there is no spatial variation in the resulting xerographic image. This elimination is accomplished according to a first aspect of the present invention by directing light from a laser source which is polarized in a plane parallel to the plane of incidence onto the photoreceptive surface at the Brewster angle, appropriate to the index of refraction of the media at both sides of the interface. It has been found that polarized light incident at this angle eliminates the reflected light and that angles close to the Brewster angle have minimal reflection that provides a significant reduction in defect level over that observed in prior implementations. This latitude with respect to incident angle can be incorporated into the design of scanning systems that must vary the angle in order to write information. More particularly, the invention is directed toward a method for increasing absorption (over the level of absorption observed with incoherent light) of incident coherent light being scanned across the surface of a photosensitive imaging member moving in a process direction comprising the steps of:

generating beams of high intensity modulated coherent light polarized in the plane parallel to the plane of the incident light, optically directing said beam onto the surface of said imaging member at an angle whose value is defined by the relationship (tangent Θ = (n'/n)

where n is the index of refraction of the first medium through which the beam travels prior to being incident at the surface of the imaging member and n' is the index of refraction of a second medium adjacent the first medium, n' being greater than n, whereas the incident light is almost totally transmitted by the top layer (due to the elimination of the reflection) resulting in a maximum delivery of illumination to the inner light generator absorbing layer 8.

DESCRIPTION OF THE INVENTION

Figure 1:
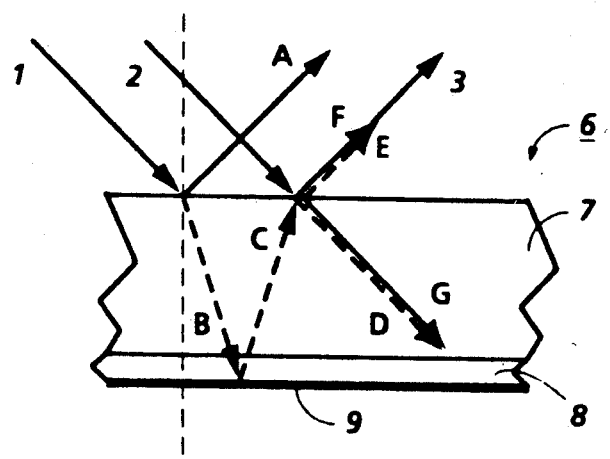
FIG. 1 shows coherent light incident upon a prior art layered photosensitive medium leading to reflections internal to the medium.
Figure 2:
FIG. 2 shows a spatial exposure variation plywood pattern in the exposed photosensitive medium of FIG. 1 produced when the spatial variation in the absorption within the photosensitive member occurs due to an interference effect.
Figure 3:
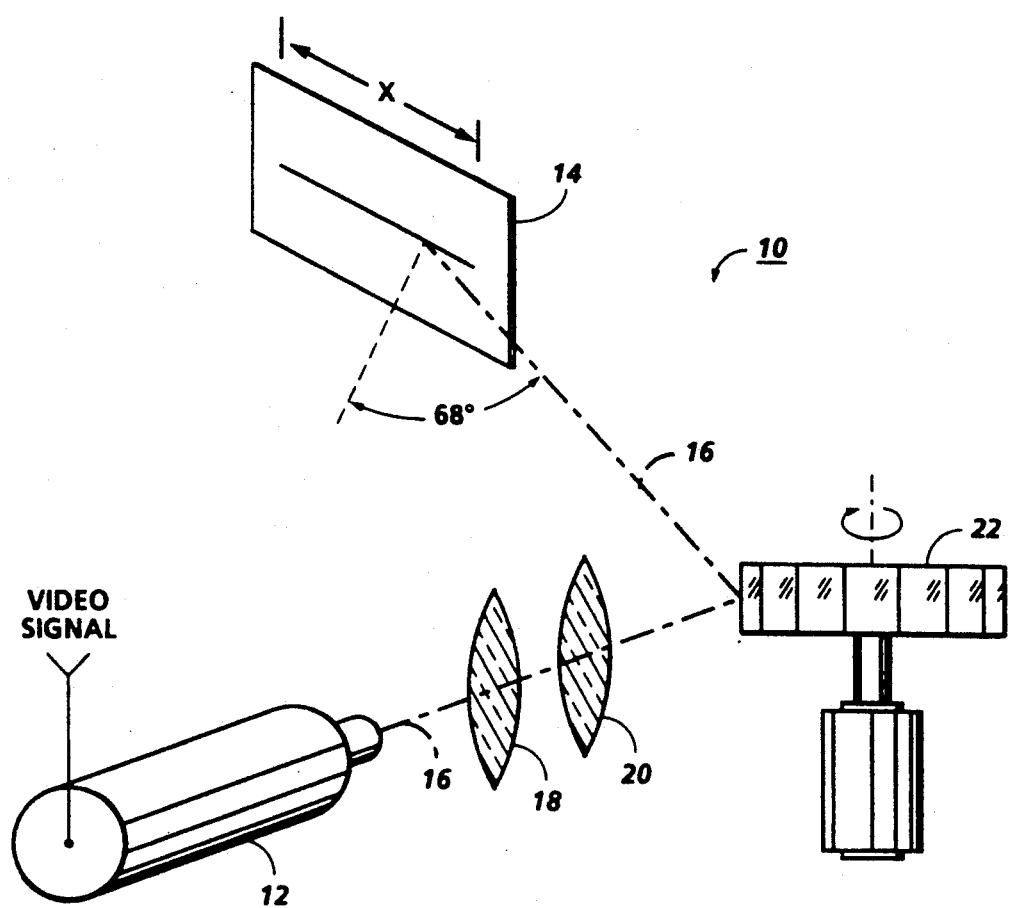
FIG. 3 is a schematic representation of an optical system incorporating a coherent light source to scan a light beam across a photoreceptor modified to reduce the interference effect according to the present invention.

FIG. 3 shows an imaging system 10 wherein a laser 12 produces a coherent output which is scanned across photoreceptor 14. Laser 12 is, for this embodiment, a helium neon laser with a characteristic wavelength of 0.63 micrometer, but may be, for example, an Al Ga As Laser diode with a characteristic wavelength of 0.78 micrometer. In response to video signal information representing the information to be printed or copied, the laser is driven so as to provide a modulated light output beam 16. The laser output, whether gas or laser diode, comprises light which is polarized parallel to the plane of incidence. Flat field collector and objective lens 18 and 20, respectively, are positioned in the optical path between laser 12 and light beam reflecting scanning device 22. In a preferred embodiment, device 22 is a multifaceted mirror polygon driven by motor 23, as shown. Flat field collector lens 18 collimates the diverging light beam 16 and field objective lens 20 causes the collected beam to be focused onto photoreceptor 14, after reflection from polygon 22. Photoreceptor 14 is a layered photoreceptor of the general type shown in cross-section in FIG. 1.

According to a first aspect of the invention, the optical components of the scanning system are arranged so as to direct the modulated light onto the surface of member 14 at a preferred angle of incidence which results in maximum transmission of the light into the imaging member photosensitive layer, and minimum reflection from the surface.

Figure 4:
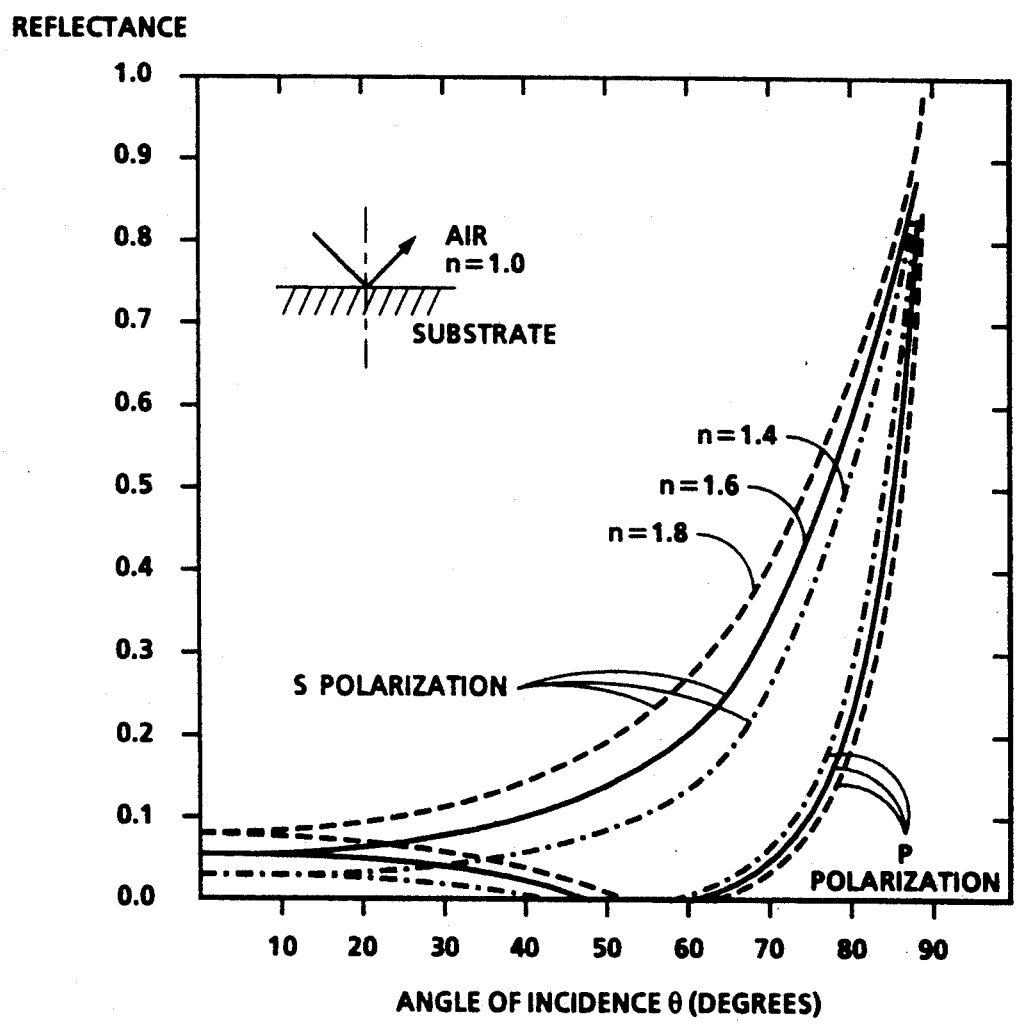
FIG. 4 shows a set of curves obtained by plotting angles of incidence vs. reflectance for various values of refractive indexes at an air/imaging member interface.
Figure 5:
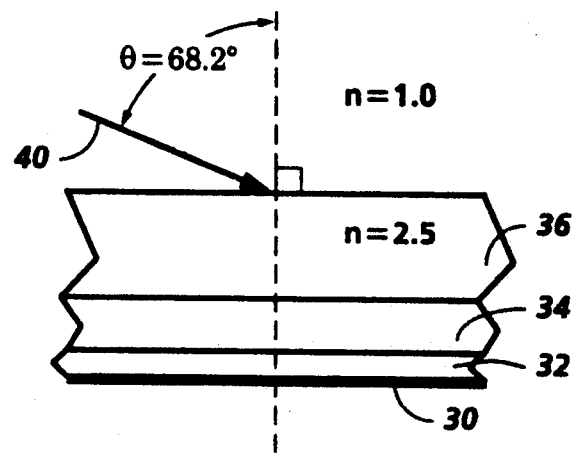
FIG. 5 is a partial cross-sectional view of an amorphous selenium imaging member with incident light directed against the surface at the Brewster angle.

This preferred angle of incidence is shown by the plot in FIG. 4, as at the Brewster angle. FIG. 4 shows a typical set of reflectance vs. angles of incidence curves for light directed against an air/thin film optical filter interface. Three curves for three values of index of refraction (n) for the filter are provided. The curves are a function of the angle, polarization, and index differences between the air and the filter, but for each curve for P polarization, there is a well-defined angle at which the reflection goes to zero. This angle, the Brewster angle, is defined by the relationship $$\tan \Theta_B = (n'/n) \quad (1)$$

where $\Theta_B$ is the angle of incidence to the interface measured from the plane normal to the interface; n is the optical index of refraction for the medium through which the light is traveling (for air, n=1) and n' is the index of refraction for medium 2. At the Brewster angle, light polarized parallel to the plane of incidence is totally transmitted, while light polarized perpendicular to the plane of incidence is partially reflected. Thus, if the light component at the incident surface can be made to consist only of light polarized parallel to the plane of incidence, then the light will be completely transmitted and no reflection will occur. Referring again to FIG. 3, and as a first example of the present invention, laser source 12 is a 20 milliwatt helium-neon laser. The light output from laser source 12 is polarized parallel to the plane of incidence. Imaging member 14 is an amorphous selenium photoreceptor shown in FIG. 5. Member 14 comprises an aluminum ground plane 30, polycarbonate layer 32, charge generating layer 34, and an amorphous selenium layer 36 which forms the interface against which the incident radiation represented by ray 40 is directed. The amorphous selenium layer 36 has an index of refraction of 2.5. The Brewster angle for this example by solving equation (1) is 68.2". Empirical evidence verifying that the incident light directed in this angle results in maximum transmission and minimum reflection was demonstrated by placing a light meter adjacent to the surface to measure light reflected at various angles of incidence. The laser beam measured 79 arbitrary units of light. The incidence angle Θ was varied with the following results:

Θ=0; (normal) meter reading=14.8
Θ=12°; meter reading=13.6
Θ=45°; meter reading=8.4
Θ=68°; meter reading=0.8

It is noted that there was still 0.8 unit of light measured at the Brewster angle. This reflection is attributed to that portion of the light which is transmitted through layers 36, 34, 32 and reflected from the ground plane 30 back out through the layers. But the reflection is greatly reduced from the usual prior art incident angles of 0° (normal) and approximately 45° incident angles.

Figure 6:
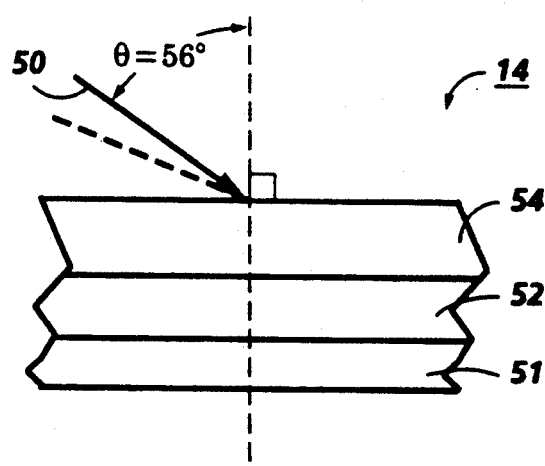
FIG. 6 is a partial cross-sectional area of a layered photosensitive imaging member with incident light directed against a surface at the Brewster angle.

As a second example, using an organic charge transport layer, and referring to FIG. 6, the same polarized incident light, represented by ray 50, is incident on imaging member 14, which, for this example, has a layered photoreceptor including an aluminized mylar ground plane 51, a selenium charge generating layer 52, and a polycarbonate charge transport layer 54, having an index of refraction of 1.5. By solving equation 1, the Brewster angle for this example is 56°. The efficacy of using this angle for the angle of incidence was verified by testing the light meter readings; at zero the light meter reading was 4.9 units, at 56°, 0.25 units.

According to another aspect of the present invention, optimized beam shaping at the exposed scan line can be obtained when using a laser diode as the laser source. An optimum shape for the light beam scanned across the imaging member 14 surface is round. The spot shape of the beam generated from laser diode light source 12 is elliptical and is typically reshaped with expensive lenses to form a circular beam. If a circular beam 50 strikes the photoreceptor 14 at a large angle $\theta$, the illuminated area is in the shape of an ellipse with a width across the minor axis identical to the diameter, d, of the beam and a width across the major axis w given by the formula:

$$w = d/\cos\theta$$

The width is 1.8 times larger than the diameter at $\theta = 56$ degrees and 2.7 times larger at $\theta = 68$ degrees.

The linear polarization of a typical laser diode is such that when the polarization requirements detailed above are met to establish the conditions required for the Brewster angle, the minor axis of the ellipse is oriented in the direction that is elongated while the major axis is oriented in the direction that remains the same size. Any residual elliptical shape can be corrected with inexpensive optics.

While the embodiment disclosed herein is preferred, it will be appreciated from this teaching that various alternative modifications, variations, or improvements therein may be made by those skilled in the art, which are intended to be encompassed by the following claims. For example, there may be variations in the index of the refraction of the imaging member 14, depending upon the photosensitive layers comprising the imaging member. For an organic photoreceptor material, the index of refraction may vary between 1.3 to 1.7 with corresponding Brewster angles of 52.4 to 59.5. Similarly, while the index of refraction of the described embodiment in FIG. 4 (amorphous silicon) is well defined at 2.5, this index may change when an alloy is formed by adding small amounts of, for example, arsenic or tellerium as is known in the art.

What is claimed is:

1. A method for exposing a layered photoreceptor member to coherent light, so as to reduce light reflectance from the surface of said member, thereby increasing transmission into said member, comprising the steps of:
    generating beams of higher intensity modulated coherent light polarized in the plane parallel to the plane of the incident light, and
    optically directing said beam onto the surface of said imaging member at an angle $\Theta$ whose value is defined by the relationship tangent $\Theta = (n'/n)$ where n is the index of refraction of a first media through which the beams travel prior to being incident at the surface of the imaging member and n' is the index of refraction of a second photosensitive media adjacent the first media, n' being greater than n,
    whereas the incident light is almost totally absorbed within said photoreceptor member.

2. The method of claim 1 wherein said coherent light beams are generated from a helium-neon laser source and wherein said first medium is air with an index of refraction of $n = 1$ and wherein said second media is amorphous selenium with an index of refraction n' of 2.5 and wherein said angle $\Theta$ is a Brewster angle of 68.2'.

3. The method of claim 1 wherein said coherent light beams are generated from a helium-neon laser source and wherein said first media is air with an index of refraction of $n = 1$, and wherein said second media is a charge transport layer whose index of refraction n is between 1.3 and 1.7, and wherein said angle $\Theta$ is a Brewster angle of 52.4° and 59.5° respectively.

4. The method of claim 1 wherein said coherent light beams are generated by a laser diode oriented so that the incident light comprises a plurality of light beams of elliptical shape having a minor axis of each beam oriented in the process direction.

5. A raster output scanning system comprising:
    means for generating a beam of high intensity, modulated, polarized coherent light, and
    optical means for imaging said beam onto the surface of a photosensitive image recording media, said optical means being adapted to direct said coherent light onto the recording media surface at the Brewster angle of incidence $\Theta_B$ defined by the function tangent $\Theta = (n'n)$ wherein n is the index of refraction of the media through which the light is being directed and n' is the index of refraction of the adjacent recording media, whereby the incident light is almost totally reflected from the surface of said recording media.

6. The scanning system of claim 1 wherein said recording media comprises:
    at least a semitransparent photoconductive charge transport layer, overlying a charge generator layer and a conductive ground plane, and
    wherein said incident light is almost totally transmitted through said charge transport layer, resulting in maximum illumination reaching said charge generator layer.

* * * * *